Feb. 8, 1949.   R. B. JOHNSON   2,461,423
PROJECTION APPARATUS FOR TRAINING MECHANISMS
Original Filed Sept. 8, 1944
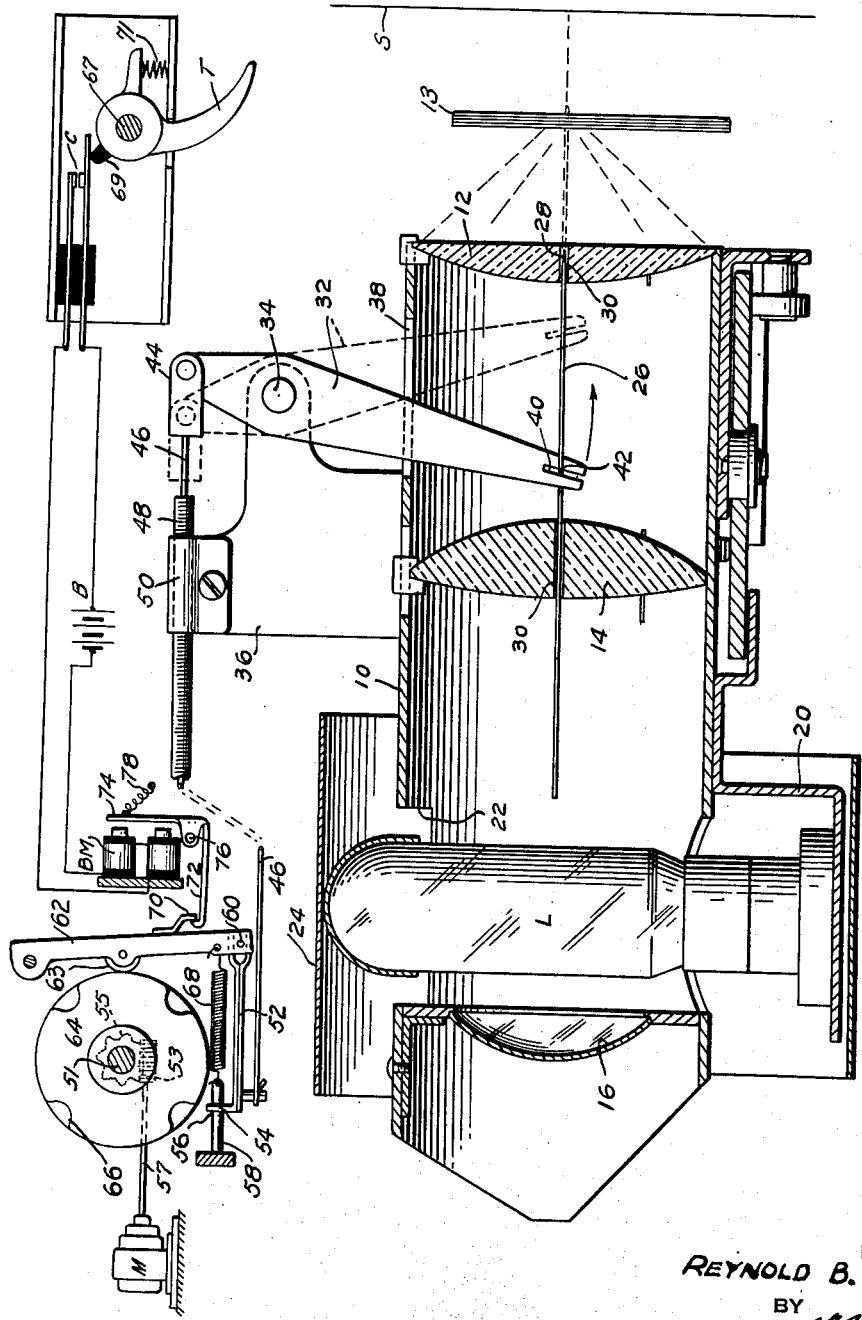
INVENTOR
REYNOLD B. JOHNSON
BY
ATTORNEY Patented Feb. 8, 1949

2,461,423

UNITED STATES PATENT OFFICE 2,461,423

PROJECTION APPARATUS FOR TRAINING MECHANISMS

Reynold B. Johnson, Binghamton, N. Y., assignor to International Business Machines Corporation, New York, N. Y., a corporation of New York Original application September 8, 1944, Serial No. 553,167. Divided and this application December 29, 1945, Serial No. 637,992

6 Claims. (Cl. 35—25)

The present invention relates to projection apparatus and, more particularly, to a light beam projector designed for use in connection with artillery training apparatus of the type shown and described in my prior patent No. 2,418,512, dated April 8, 1947, for Artillery training apparatus and method, of which this application is a division.

Briefly, in the training apparatus of the above mentioned application, the student gunner is furnished with a maneuverable dummy weapon which is employed for the purpose of aiming at a moving target in the form of a moving picture projection on a target screen. The apparatus includes a projection mechanism which constitutes the subject matter of the present invention for creating and projecting tracer effects upon the screen by means of a concentrated and properly controlled beam of light. In the production of the tracer effects by this projection apparatus, stationary and preferably circular illuminated spots are caused to be projected upon the target screen at exact positions determined by the aiming and firing of the dummy training weapon in the hands of the student gunner. These spots are of predetermined size and immediately upon their projection on the screen they are caused to gradually and uniformly diminish in size to points of nothingness and at a predetermined rate of diminution so that a condition of close-off occurs after a predetermined length of time. For the projection and control of such tracer spots on the target screen, a system of placement punching of very small holes through opaque paper tracer blank media and the immediate projection through the punched holes of a concentrated beam of light is employed. An area of the tracer blank media is correlated with the effective area of the target screen and thus, by proper placement of holes in the tracer blank media within the limits of the correlated area, corresponding placement of tracer spots is effected on the target screen.

Gradual diminution and close-off of the projected tracer spots on the target screen are effected by utilizing composite multi-layer tracer blank media whose effective correlated area, as described above, consists of multiple layers of thin opaque sheet material. Each layer or lamination of the tracer blank media is capable of moving in a vertical plane and in a direction different from the directions of movement of the other layers which comprise its various counterparts.

According to the present invention, to effect proper punching and placement of holes in the correlated area of the tracer blank media, and for the concentration upon the perforations of a beam of light, a moving light tube is employed and includes an internal light source, an optical system including a concentrating lens, and a punch or needle, the operation of which is trigger-controlled by the operator of the dummy weapon. The light tube is movably mounted behind, and in close proximity to, the correlated area of the tracer blank media and one novel feature thereof is the fact that the needle itself passes axially through the concentrating lens and is normally maintained in a retracted position within the lens and is adapted to be projected at will by means of the trigger control so as to perforate or puncture the tracer blank media, each perforation corresponding to the discharge of a luminous tracer projectile. The movement of the light tube, and the consequent orientation of the perforating needle relative to the tracer blank media, is correlated with the orientation of the dummy weapon relative to the target screen. To effect correlation of movement between the dummy weapon and the light tube, mechanical connections are extended between these two instrumentalities and are in the form of cables and other control devices. The light tube is supported in and its movements are jointly controlled by a horizontal train cradle from which it derives its lateral angular components of movement, and an elevational train cradle from which it derives its vertical angular components of motion. These components of motion are complex in their nature and consist of both shifting movements bodily and angularly. Provision is made for maintaining the center of the concentrating lens, through which the needle extends and from which it is periodically projected, in a vertical plane, all points of which are maintained equidistant from the vertical plane of the tracer blank media. In other words, the center of the concentrating lens remains at all times the same predetermined distance from the vertical plane of the tracer blank media. In this manner, the effects of spherical aberration during aiming of the dummy weapon, and existing by virtue of the angular displacement of the dummy weapon relative to the plane of the target screen at the relatively short distance existing between the two, is compensated for when tracer effects are cast upon the screen.

The present invention is concerned solely with the construction and operation of the light tube assembly and not with the mechanism by means of which its bodily movements are controlled. One of the novel features of the present invention consists of the provision of a concentrating lens assembly having formed centrally therein small apertures providing guideways for the needle or punch which perforates the moving sheets of paper. Normally this needle occupies a retracted position with the point thereof wholly disposed within the confines of one of the lenses but it is adapted to be projected forwardly to a position well in advance of the lens for paper punching purposes. The needle is adapted to be actuated under the control of a trigger mechanism.

Provision of a light tube assembly of the character briefly described above being the principal object of the invention, numerous other objects and advantages thereof will become apparent as the nature of the invention is better understood.

In the accompanying single sheet of drawing the figure is a longitudinal sectional view, partly in elevation, taken centrally through a light tube assembly constructed in accordance with the principles of the present invention.

The light tube assembly involves in its general organization a substantially cylindrical casing 10, the forward end of which has mounted therein a lens 12 which is of plano-convex design. A double convex lens 14 is suitably mounted within the casing 10 medially thereof and a reflector 16 serves to close the rear end of the casting. A source of light in the form of an electric lamp L, suitably supported on a bracket 20 affixed to the casing 10, projects transversely through the casing 10 and has its filament suitably centered in front of the reflector 16. The lamp L passes through an opening 22 in the upper region of the casing and an open shield 24 is positioned over the top of the lamp L, the shield and opening 22 affording suitable ventilation for the lamp L to allow heat issuing therefrom to escape from the casing.

The paper piercing element per se is in the form of an elongated plunger or needle 26, the forward end of which is sharpened as at 28 for paper punching purposes. The needle 26 is slidably supported in the two lenses 12 and 14 and toward this end a relatively small axial bore 30 is drilled through each of the lenses and the two bores exist in axial alignment when the lenses are properly mounted in position within the casing 10.

The needle 26 is slidable axially of the tubular casing 10 from the retracted position shown in full lines wherein its pointed end is withdrawn completely into the lens 12, to the advanced dotted line position thereof wherein the pointed end penetrates and passes completely through a tracer medium such as is shown at 13.

In order to move the needle 26 from its retracted position to its advanced position for paper piercing purposes, a trigger member 32 is pivoted as at 34 medially of its ends to a bracket 36 secured to the upper portion of the casing 10. The trigger 32 projects downwardly through an opening 38 provided at the top of the casing 10. At its lower end the member 32 is bifurcated as at 40. The needle is provided with an offset portion 42, which portion is straddled by the bifurcations 40 in order that upon oscillation of the trigger 32 its movements will be followed by the needle. The upper end of the trigger 32 has pivoted thereto a link 44 to which there is attached one end of a Bowden wire 46 having a flexible tube 48 which is clamped adjacent one end thereof in a bracket 50.

The needle operating trigger member 32 is relatively narrow and the needle 26 is of comparatively small diameter and thus neither of these two elements creates any appreciable optical disturbance to the transmission of light issuing from the lamp L through the lenses 14 and 12. The lenses 14 and 12 constitute in combination a condenser lens assembly whereby light issuing from the lamp L is directed to and focused upon the hole created by the needle 26 each time it penetrates the tracer media in the effective correlated area at the rear of the paper frame. In this manner, a narrow light beam is projected upon the screen S to simulate tracer effects, as described in the above mentioned co-pending application.

The Bowden wire 46 has an end thereof attached to a link 52 having a flange 54 thereon which is provided with an aperture 56 therein through which a guide rod 58 extends. The upper end of the link 52 is provided with a universal connection 60, by means of which it is secured to and suspended from a follower 62 carrying a roller 63. The roller 63 is normally maintained in engagement with the periphery of a continuously rotating cam 64 having a series of notches 66 formed therein. Pressure of the roller 63 upon the periphery of the cam 64 is maintained by means of a spring 68. The cam 64 is adapted to be continuously rotated under the influence of an electric motor M and toward this end the cam 64 is mounted upon a shaft 51 having a worm 53 mounted thereon meshing with a worm gear 55 carried on the motor shaft 57.

The follower 62 has mounted thereon a latch plate 70 and a latch member 72 cooperates therewith to normally maintain the follower 62 elevated so that the roller 63 carried thereby may not enter the various notches 66. The latch member 72 is integrally formed on the armature 74 of a needle operating magnet BM. The latch and armature assembly 72, 74 is pivoted as at 76 for tilting movement and is normally biased by means of a spring 78 to a position wherein the armature is remote from the magnet core and the latch member 72 is operative to maintain the follower 62 elevated. It will be seen that upon energization of the magnet BM the armature 74 will be attracted downwardly toward the magnet core and the latch 72 will be swung to the right to release the latch plate 70, and consequently the follower 62, in order that the roller 63 may in traversing the periphery of the cam 64 fall into the cam depressions 66.

Since the free end of the follower 62 is connected by means of the link 52 to the Bowden wire, it will be seen that each time the roller enters any one of the cam depressions the link 52 will be moved, thus drawing the Bowden wire 46 with it and causing the needle 26 to be moved to its advanced position for tracer media punching.

The magnet BM is adapted to be operated under the control of a finger trigger T pivoted as at 67 in a dummy weapon construction (not shown) and having a finger 69 designed for cooperation with a pair of normally open contacts c to close the same and establish an electric circuit from a battery B through the magnet BM. The trigger is spring pressed as at 71 in a counterclockwise direction, as shown in the drawing. It will be seen that when the trigger is engaged or pressed, the magnet BM will become energized, thus causing release of the follower 62. Upon release of the trigger T the magnet will become deenergized and the latch 72 will assume its holding position beneath the latch plate 70.

While there have been shown and described and pointed out the fundamental novel features of the invention as applied to a preferred embodiment, it will be understood that various omissions and substitutions and changes in the form and details of the apparatus illustrated and in its operation may be made by those skilled in the art

What is claimed is:

1. Punching instrumentalities of the character described comprising a hollow casing having a lens mounted at one end thereof, there being a relatively small axial bore extending through said lens and substantially concentric with the axis of the casing, a needle-like punch slidably disposed in said aperture and movable from a retracted position wherein one end thereof is withdrawn into the lens to an advanced position wherein said end is projected outwardly from the lens to penetrate a paper medium and create an aperture therein, means for reciprocating said punch, and a light source so disposed within said casing as to project light through said lens for subsequent concentration on the aperture created by said punch.

2. Punching instrumentalities of the character described comprising a hollow casing having a lens mounted at one end thereof, a reflector mounted at the other end thereof, a second lens mounted in the casing medially thereof, there being a relatively small axial bore extending through each of said lenses and substantially concentric with the axis of the casing, a needle-like punch slidably supported in said axial bores and movable from a retracted position wherein one end thereof is withdrawn into said first mentioned lens to an advanced position wherein said end is positioned outwardly of the lens to penetrate a paper medium and create an aperture therein, said lens forming the sole support for said punch, means for periodically reciprocating the punch, and a light source disposed within said casing between the reflector and the medially disposed lens for projecting light through said lenses for subsequent concentration on the aperture created by said punch.

3. Punching instrumentalities of the character described comprising a hollow cylindrical casing having a lens mounted at one end thereof, a reflector mounted at the other end thereof, a second lens mounted in the casing medially thereof, there being a relatively small axial bore extending through each of said lenses and substantially concentric with the axis of the cylindrical casing, a needle-like punch slidably supported in said axial bores and movable from a retracted position wherein one end thereof is withdrawn into said first mentioned lens to an advanced position wherein said end is positioned outwardly of the lens for punching purposes, said lenses forming the sole support for said punch, a trigger member pivotally connected to said casing and having one end thereof attached to said punch, said trigger member being adapted upon oscillation thereof to reciprocate the punch, a Bowden wire connected to said trigger member, and means for actuating the Bowden wire.

4. Punching instrumentalities of the character described comprising a hollow cylindrical casing having a lens mounted at one end thereof, a reflector mounted at the other end thereof, a second lens mounted in the casing medially thereof, there being a relatively small axial bore extending through each of said lenses and substantially concentric with the axis of the cylindrical casing, a needle-like punch slidably supported in said axial bores and movable from a retracted position wherein one end thereof is withdrawn into said first mentioned lens to an advanced position wherein said end is positioned outwardly of the lens for punching purposes, said lenses forming the sole support for said punch, a trigger member pivotally connected to the casing and having one end thereof connected to the punch, a Bowden wire connected to said trigger member at one end thereof, a reciprocable link connected to the other end of said Bowden wire, a cam follower connected to said link, a rotatable cam wheel associated with said follower and operable upon rotation thereof to impart oscillating movement to the follower, and means for rotating the cam wheel.

5. Punching instrumentalities of the character described comprising a hollow cylindrical casing having a lens mounted at one end thereof, a reflector mounted at the other end thereof, a second lens mounted in the casing medially thereof, there being a relatively small axial bore extending through each of said lenses and substantially concentric with the axis of the cylindrical casing, a needle-like punch slidably supported in said axial bores and movable from a retracted position wherein one end thereof is withdrawn into said first mentioned lens to an advanced position wherein said end is positioned outwardly of the lens for punching purposes, said lenses forming the sole support for said punch, a trigger member pivotally connected to said casing and having one end thereof connected to the punch, a Bowden wire connected at one end thereof to said trigger member, a movable link connected to the other end of said Bowden wire, a follower mounted for rocking movement about an axis, a cam wheel operatively associated with said follower and having a plurality of cam depressions therein, latch means normally maintaining said follower out of engagement with said cam wheel and an electromagnet operable upon energization thereof to release said latch means and allow said follower to move into engagement with said cam wheel.

6. Punching instrumentalities of the character described comprising a hollow casing having a lens mounted at one end thereof, there being a relatively small axial bore extending through said lens and substantially concentric with the axis of the casing, a needle-like punch slidably disposed in said aperture and movable from a retracted position wherein one end thereof is positioned adjacent said lens to an advanced position wherein said end is projected to a point remote from the lens to penetrate a paper medium and create an aperture therein, means for reciprocating said punch, and means for projecting light through said lens for concentration by the latter upon the aperture created in the paper medium by said punch.

REYNOLD B. JOHNSON.

REFERENCES CITED

The following references are of record in the file of this patent:

UNITED STATES PATENTS

| Number | Name | Date |
|---|---|---|
| 2,350,750 | Gerstenberger | June 6, 1944 |